（12） United States Patent
Bise et al.

(10) Patent No.: US 6,826,342 B1
(45) Date of Patent: Nov. 30, 2004

(54) TEMPERATURE TUNING OF DISPERSION IN PHOTONIC BAND GAP FIBER

(75) Inventors: Ryan Bise, Chatham, NJ (US); Jayesh Jasapara, North Plainfield, NJ (US)

(73) Assignee: Fitel U.S.A. Corp., Norcross, GA (US)

( * ) Notice: Subject to any disclaimer, the term of this patent is extended or adjusted under 35 U.S.C. 154(b) by 0 days.

(21) Appl. No.: 10/388,110

(22) Filed: Mar. 13, 2003

(51) Int. Cl.[7] .............................. G02B 6/02; G02B 6/20
(52) U.S. Cl. ........................................ 385/125; 385/123
(58) Field of Search ................................ 385/123–127, 385/129, 27; 398/82–88

(56) References Cited

U.S. PATENT DOCUMENTS

| | | |
|---|---|---|
| 5,802,236 A | 9/1998 | DiGiovanni et al. |
| 5,833,896 A | 11/1998 | Jacobs et al. |
| 6,385,368 B1 | 5/2002 | Amundson et al. |
| 6,418,258 B1 | 7/2002 | Wang |
| 6,445,862 B1 | 9/2002 | Fajardo et al. |
| 2003/0142902 A1 * | 7/2003 | Sugitatsu .................... 385/27 |

OTHER PUBLICATIONS

C. Kerbage, A. Hale, A. Yablon, R.S. Windeler, B.J. Eggleton, "Integrated All–Fiber, Variable Attenuator Based on Hybrid Microstructure Fiber", Published Nov. 5, 2001, Applied Physics Letters.

* cited by examiner

Primary Examiner—Hemang Sanghavi

(57) ABSTRACT

A photonic band gap fiber structure is formed to include a plurality of filled air holes surrounding a solid silica core region. The material used to fill the air holes is chosen to exhibit an index of refraction that is greater than the index of the core, where the fill material refractive index is also adjustable as a function of temperature. Therefore, by adjusting the temperature of the PBG fiber, the dispersion characteristic of the propagating signal can be modified.

5 Claims, 4 Drawing Sheets

TEMPERATURE TUNING OF DISPERSION IN PHOTONIC BAND GAP FIBER

TECHNICAL FIELD

The present invention relates to the field of photonic band gap fibers and, more particularly, to the use of temperature tuning of a filled lattice structure to modify the dispersion characteristics of the photonic band gap fiber.

BACKGROUND OF THE INVENTION

Photonic band gap (PBG) structures consist of a crystal-like periodic arrangement of materials having different refractive indices. Bragg reflections off structures having periodicity extending in more than one dimension can result in the complete reflection of light at certain frequencies, independent of the angle of incidence. The structure is said to possess a band gap at these frequencies. If there is a defect in the periodicity of the structure, then light frequencies lying in the band gap are confined to the defect by Bragg reflection from the surrounding crystal structure, thus making the defect a light guide.

In a PBG fiber, confinement of light to the core region will therefore occur through reflections off of the two-dimensional microstructure surrounding the core. This unique confinement mechanism, as opposed to total internal reflection (TIR) guidance in conventional optical fibers, gives rise to interesting dispersion properties in PBG fibers that are strongly influenced by the crystal structure. Heretofore, research on PBG fibers has focused on the presence or absence of the band gaps, and little work has been done on studying the properties of the guided light. One critical characteristic that has not been properly analyzed, either theoretically or experimentally; is dispersion (the broadening of signal pulses during propagation along a PBG fiber). In particular, there is little known of how dispersion varies with wavelength across the band gap and, as a result, fibers with dispersion appropriate for transmitting communications signals have not been specified. In particular, transmission applications require a low and flat dispersion, whereas dispersion compensation or other device applications may require high dispersions.

Thus, a need remains in the prior art for an arrangement to control and/or modify the tunable dispersion range in a photonic band gap optical fiber.

SUMMARY OF THE INVENTION

The need remaining in the prior art is addressed by the present invention, which relates to the field of photonic band gap (PBG) fibers and, more particularly, to the use of temperature tuning of a filled lattice structure to modify the dispersion characteristics of the PBG fiber.

In accordance with the present invention, a PBG fiber is formed to comprise a solid silica core region surrounded by a lattice of air holes formed in the silica material. The holes are filled with a material having a relatively high index of refraction (higher than the silica core), where the precise value of the index of refraction is a function of temperature. The higher index of refraction in the lattice surrounding the low-index core ensures that the band gap effect is the only possible guidance mechanism for optical signal propagation (as opposed to TIR for a conventional optical fiber). It has been found that varying the temperature of the filled PBG fiber leads to changes in the photonic band gap spectra, such as changes in both the spacing and width of the band gaps.

Therefore, the ability to "tune" the photonic band gap by adjusting the temperature results in the ability to form tunable filters and dispersion compensators in PBG fiber.

In one particular embodiment of the present invention, an oil exhibiting an index of refraction (at room temperature) of n=1.80 at a wavelength of 589 nm is used to fill the air holes, the oil exhibiting a change in refractive index as a function of temperature (dn/dT) of approximately $-6.8 \ast 10^{-4}/°$ C., as compared with the temperature-dependent change in the index of refraction for silica glass ($dn/dT = 1.19 \ast 10^{-5}/°$ C.).

Other and further embodiments of the present invention will become apparent during the course of the present invention, and by reference to the accompanying drawings.

BRIEF DESCRIPTION OF THE DRAWINGS

Referring now to the drawings.

DETAILED DESCRIPTION

In a photonic band gap (PBG) fiber, confinement of light to the core occurs through reflections off the two-dimensional periodic microstructure surrounding the core. This unique core confinement mechanism, as opposed to total internal reflection (TIR) guidance in conventional optical fibers, gives rise to interesting dispersion properties in PBG fibers that are strongly influenced by the crystal structure. Transmission applications require a low and flat dispersion characteristic, whereas dispersion compensation or other device applications may require high dispersions. An advantage of PBG fibers is that depending upon the application, the crystal structure can be designed to achieve the required dispersion profile.

Figure 1:
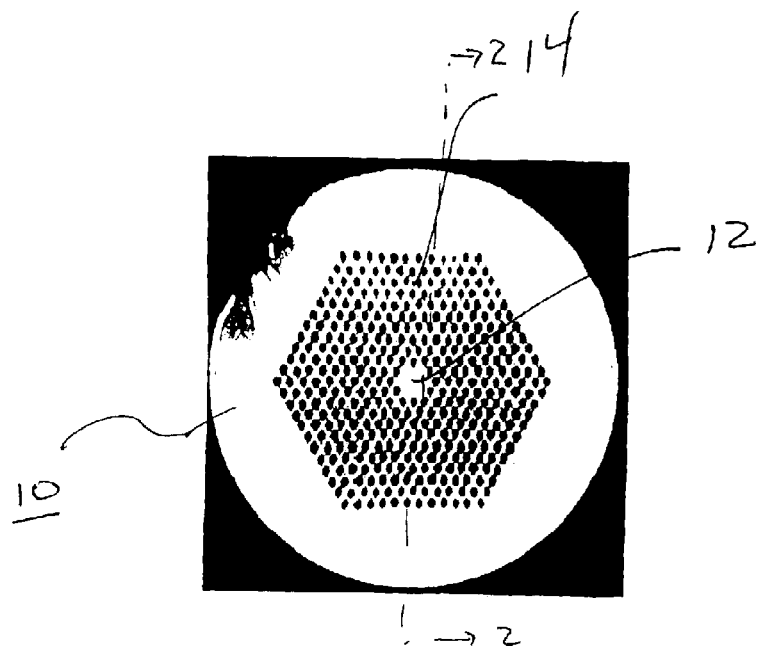
FIG. 1 is a cross-sectional view of a liquid-filled photonic band gap (PBG) fiber capable of temperature tuning in accordance with the present invention.

FIG. 1 illustrates one such fiber 10, which includes a silica core region 12 and a triangular lattice of air holes 14 surrounding solid silica core 12. In accordance with the present invention, and shown particularly in FIG. 2, a length of fiber 10 is modified to incorporate a high index material 16 within air holes 14. In a preferred embodiment, a liquid material 16 is used, since there exist a variety of processes known in the art to draw a liquid into air holes within an optical fiber. High index material 16 is chosen to exhibit a refractive index that varies as a function of the ambient temperature of the PBG fiber. It has been found that by varying the temperature (and hence, the index of refraction), the photonic band gap spacing, as well as the widths of the band gaps will likewise be varied. Thus, the ability to tune the photonic band gap results in the ability to form devices such as tunable filters or tunable dispersion compensators. One exemplary liquid material, an oil (such as Series M, supplied by M. Cargille Laboratories) has been found to exhibit a change in its refractive index as a function of temperature (dn/dT) on the order of $-6.8*10^4/°$ C.

Figure 2:
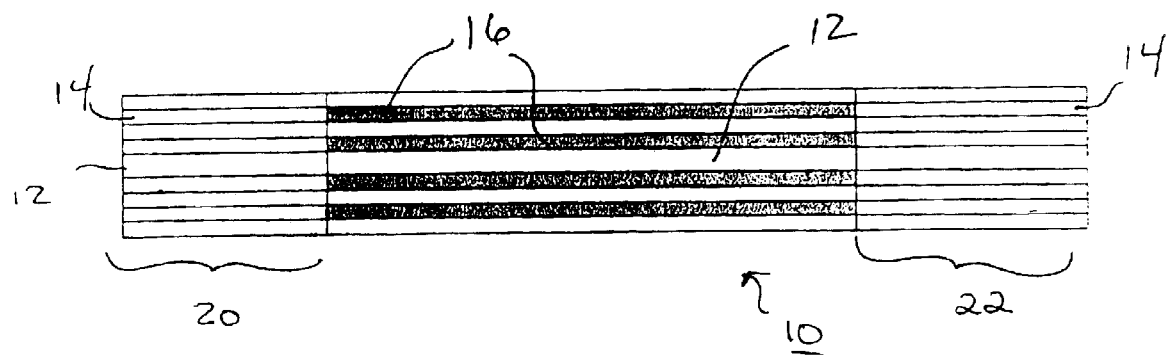
FIG. 2 is a side view of the fiber of FIG. 1, illustrating in particular the coupling of a section of filled PBG fiber between an input communication fiber and an output communication fiber.

FIG. 2, in a side view, illustrates filled PBG fiber section 10 as disposed between an input fiber 20 and output fiber 22, where the presence of the PBG structure results in supporting the propagation of an optical signal along core region 12. In one embodiment of the present invention, a filled PBG fiber was formed that comprised a plurality of air holes 14 with each hole comprising a diameter of 2.4 $\mu$m, a hole-to-hole spacing (also referred to as "pitch") of 4.3 $\mu$m, and a core region diameter of 10.5 $\mu$m. In the structure as shown in FIG. 2, input fiber 20 and output fiber 22 are illustrated as having "empty" air holes 14, used to guide a propagating light signal into and out of PBG fiber section 10.

Figure 3:
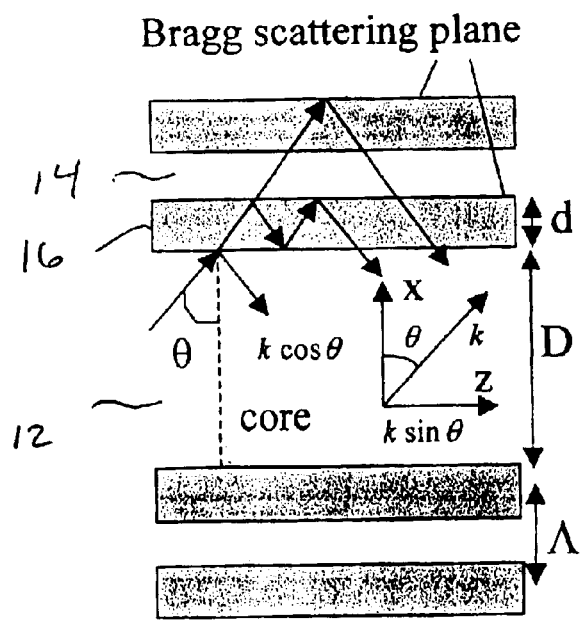
FIG. 3 illustrates a simplified and enlarged cross-section of PBG fiber, illustrating in particular the transmission of both the transverse and axial signal components.
Figure 4:
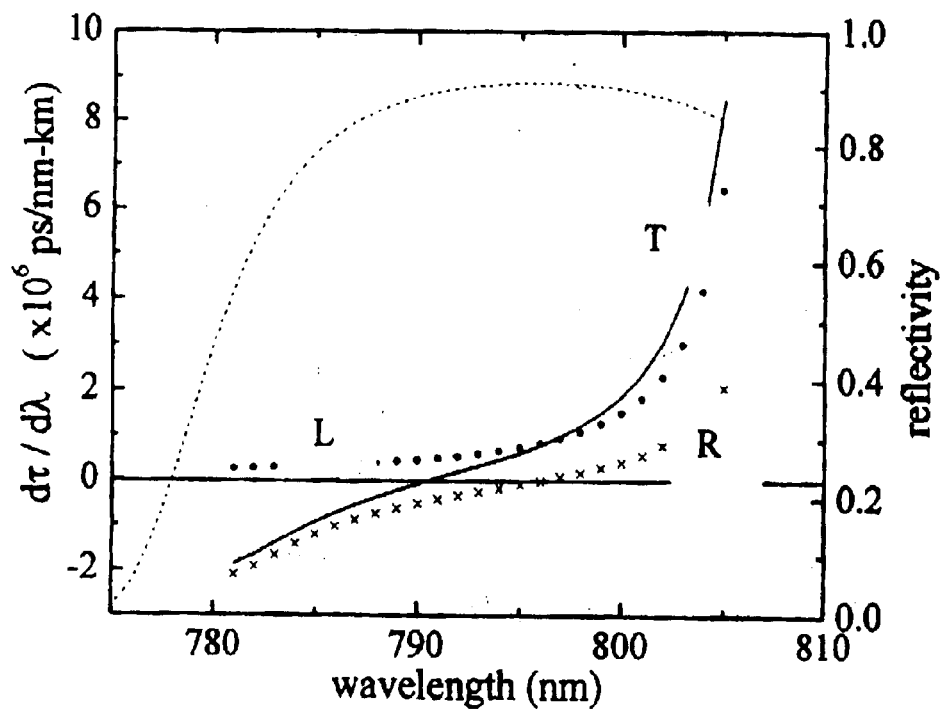
FIG. 4 is a graph illustrating the contributions to dispersion associated with both reflectance (R) and wavelength (L), also illustrating the total (T) dispersion value.

The PBG fiber dispersion curves have been found to be similar to the dispersion of resonant structures, such as Fabry-Perot cavities or thin films. However, the dispersion of such well-known structures is symmetrical about the peak of the resonance, while the wavelength of zero dispersion for a PBG fiber is shifted to the short wavelength side of the transmission peak. The features of a PBG fiber can be best explained by using the simple construction of propagation between two stacks of thin film reflectors, as shown in FIG. 3, which illustrates an enlarged cross-section of PBG fiber 10, showing core region 12, air columns 14 and high index material 16. As shown, light propagates in the Z direction, and the presence of "walls" of high index material 16 consist of thin films that behave like resonant structures with internal multiple scattering determining the phase response. Propagation can be broken, as shown, into a transverse component and an axial component. In this structure, it can be shown that the transverse component of the wave vector is constant and does not contribute to the phase dispersion. The resonant Bragg scattering condition between and within the Bragg planes created by high index material 16 implies that the angle of propagation decreases with increase in wavelength, resulting in a decrease in the forward propagating component of the wave vector. The dispersion of the structure is then determined by this delay, as well as the phase change on reflection from each surface. FIG. 4 illustrates the contribution to dispersion of each component, as well as the total dispersion across a resonance. The dispersion due to reflection off the Bragg crystal (denoted as curve "R") causes the inflection in the total dispersion curve, while the dispersion due to the wavelength-dependent angle of propagation (curve L) gives rise to a rapid increase of dispersion at the long wavelength edge, while also shifting the zero crossing of dispersion to the short wavelength side of the resonance peak.

Figure 5:
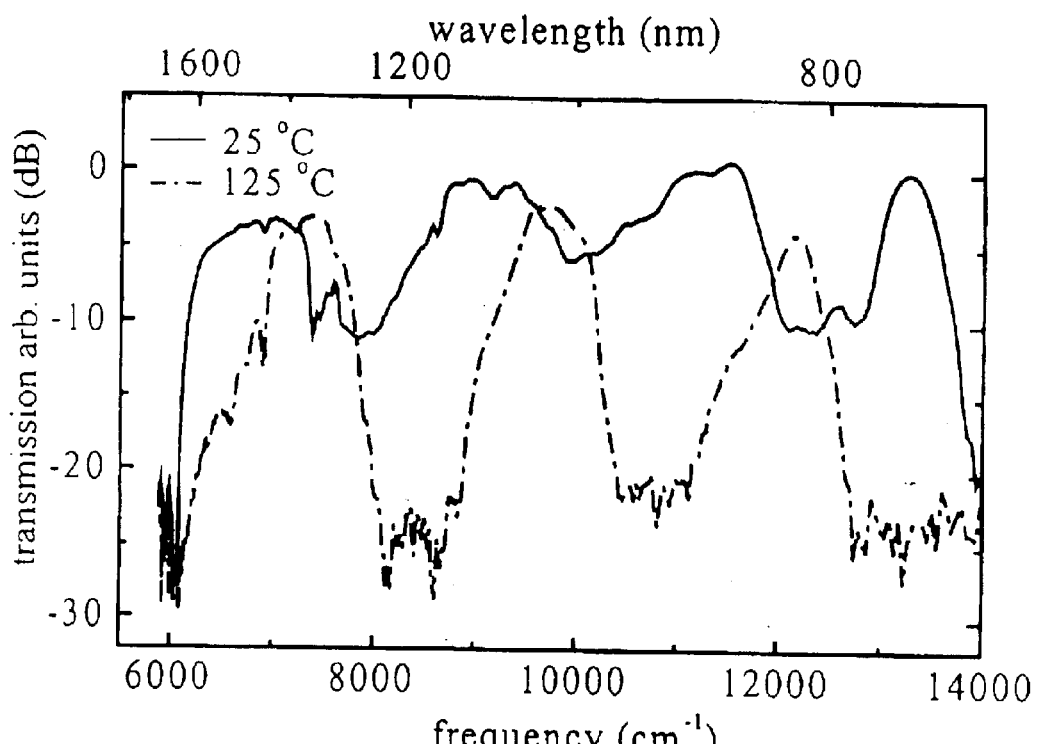
FIG. 5 is a graph of the transmission spectra for the fiber of FIG. 1, measured at both 25° C. and 125° C.

As mentioned above, the insertion of high index material 16 into holes 14 results in a structure where core 12 is now a low-index "defect" within the regular triangular lattice 14 of high index fill material 16, separated by silica webs. In this arrangement, therefore, the only manner in which light can be guided in core 12 is via the photonic band gap effect. In particular, upon placing high index material 16 into holes 14, a strongly wavelength-dependent transmission is observed, as shown in FIG. 5. For the purposes of studying the temperature-dependent characteristics of the present invention, a photonic crystal fiber with a total length of 1.5 m was filled with a high index fluid for a distance of approximately 10 cm, using a vacuum process to draw the fluid into the air holes. The liquid was then positioned into the middle of the fiber using both air pressure and vacuum. An over-filled launch from a white light source was coupled into one end of the fiber (such as input fiber 20 of FIG. 2), while the opposite end (such as output fiber 22 of FIG. 2) was fed directly into an optical spectrum analyzer. Three separate 3 cm diameter loops were placed between the input end and the liquid-filled region to confine the light to the core region. Transmission spectra were recorded from 25° C. to 150° C., and then back down to 25° C., in 25° C. intervals (no noticeable hysteresis was observed). FIG. 5 shows the transmission spectra for both 25° C. and 125° C. Referring to the transmission spectra for 25° C., a series of transmission windows are shown, corresponding to photonic band gaps with an energy spacing of approximately 2000 cm$^{-1}$. The photonic band gap effect has been observed over fiber lengths from 4 cm up to 2 meters, with a loss value for band gap regions less than 2.5 dB/m obtained by cutback measurements. As shown in FIG. 5, changing the temperature of the high index liquid leads to a large change in index (dn/dT=$-6.8*10^{-4}/°$ C.) within the holes, creating noticeable changes in both the photonic band gap spacing as well as the band gap width.

Figure 6:
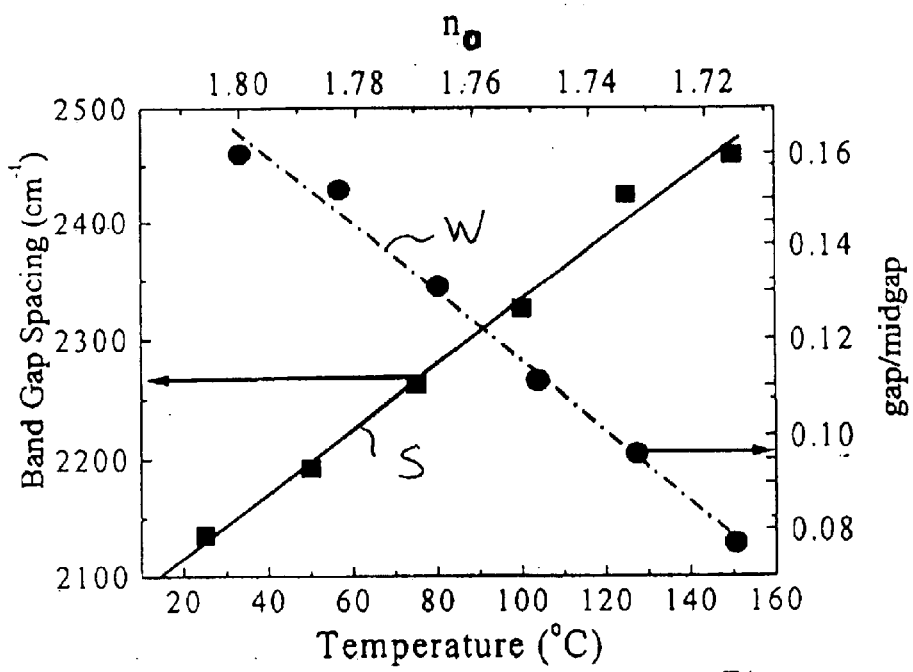
FIG. 6 is a graph depicting the dependence of the photonic band gap spacing and width on the index of refraction (which is illustrated as changing as a function of temperature).

FIG. 6 plots both the band gap spacing (curve S) and band gap width (curve W), as a function of temperature, for the filled PBG fiber of the present invention. The 3 dB bandwidths for band gaps near 1400 nm are displayed in terms of gap:midgap ratio, defined as band gap width divided by the band gap center wavelength, and measured as a function of temperature (° C.) and index ($n_0$) (since the refractive index changes as a function of temperature). As shown in FIG. 6, the band gap spacing is inversely proportional to the refractive index values, while the width of the photonic band gap is directly proportional to the refractive index. The decrease in the width of the photonic band gaps as the index decreases is entirely expected as the index contrast between the high index filled regions of the lattice and the surrounding low silica web decreases. Indeed, only wavelengths that match of the phase conditions of the lattice structure will undergo Bragg reflection and give rise to the photonic band gap phenomenon.

The ability to continuously and reversibly change the photonic band gap structure by thermally adjusting the refractive index of the fill material thus allows the band gap features of the PBG fiber of the present invention to be sensitively tuned.

Figure 7:
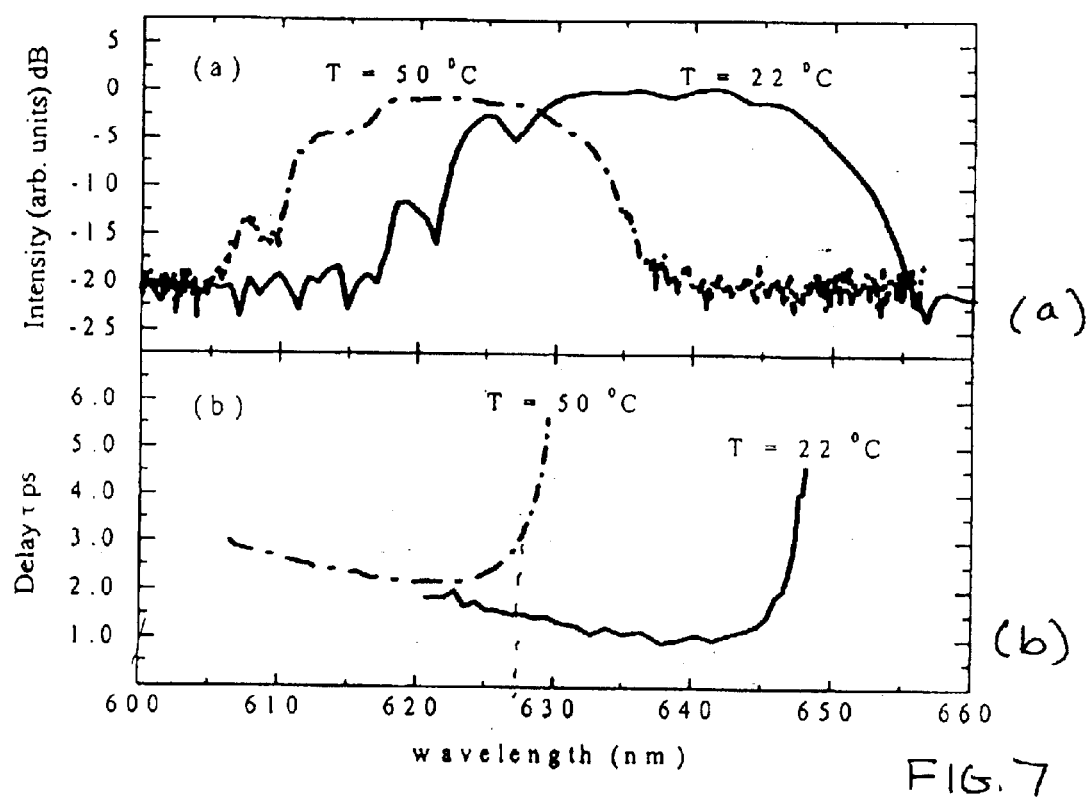
FIGS. 7(a) and (b) contain graphs of the transmission spectra and group delay for the 635 nm band gap of a filled photonic fiber, recorded at 22° C. and 50° C., respectively.

The transmission spectra and group delay for the 635 nm band gap of the filled photonic fiber of the present invention, recorded at temperatures of 22° C. and 50° C., are illustrated in FIGS. 7(a) and (b), respectively. Referring to FIG. 7(a), the transmission spectrum at 22° C. is centered at approximately 635 nm, with a smoother fall-off on the long wavelength side of the transmission band. The bandwidth at 22° C. is approximately 30 nm. By increasing the temperature (and thus decreasing the index of refraction of the material filling the air holes in the photonic band gap structure), the center wavelength shifts to the shorter wavelength side of the gap. As shown in FIG. 7(a), by increasing the temperature to 50° C., the center wavelength has shifted downward to a shorter wavelength of 620 nm. Additionally, the bandwidth is somewhat reduced (to a value of, approximately, 20 nm). Thus, in accordance with the present invention, the location of the band gaps in a filled photonic band gap structure can be tuned by adjusting the temperature of the device. The group delay at both temperatures, as shown in FIG. 7(b), exhibits the same distinct features. That is, the delay decreases with increasing wavelength, passes through a minimum value, then increases sharply at the long wavelength edge of the transmission band. As shown in FIG. 7(b) by increasing the temperature to 50° C., the transmission wavelength exhibiting minimal delay reduces from approximately 640 nm to 620 nm.

Figure 8:
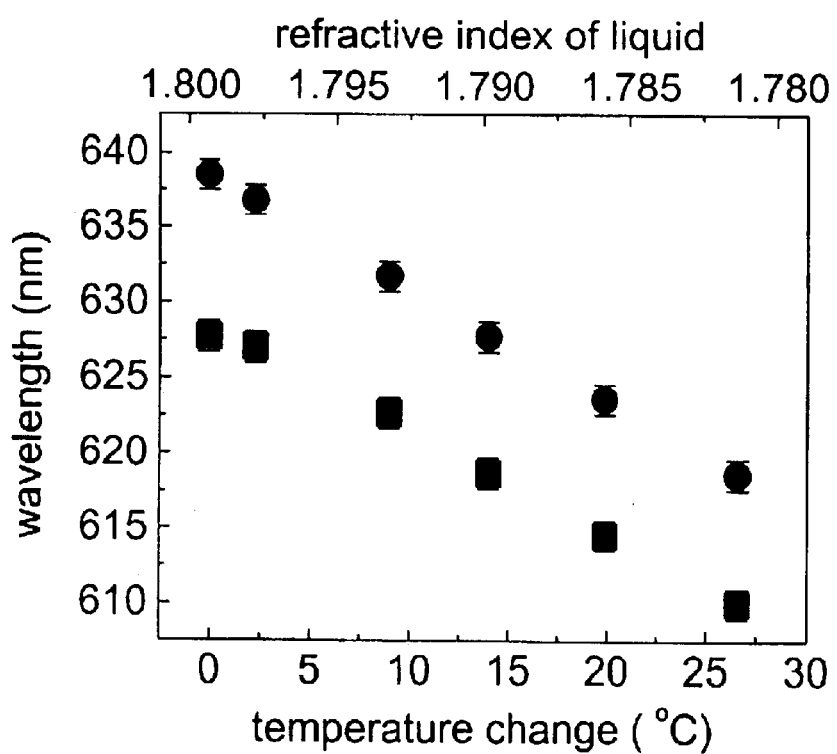
FIG. 8 is a plot of the minimum group delay value and long wavelength edge of the filled PBG fiber, as a function of temperature.

The long wavelength edge of the photonic band gap (denoted as curve "E") and the minimum group delay value (denoted as curve "D"), measured as a function of temperature, are illustrated in FIG. 8. Both the minimum group delay and the edge of the band gap are shown to shift linearly with temperature, with similar slopes of 16.0±1.0 $cm^{-1}/°$ C. and 17.7±0.5 $cm^{-1}/°$ C., respectively.

In accordance with the temperature adjustment principles of the present invention, group delay curve D moves with band gap curve E as the temperature is adjusted, indicating that the phase dispersion is a result of the photonic band gap guidance mechanism. The linear shift in the band gap towards shorter wavelengths as the index (temperature) is decreased indicates that the k-vector (k=2π/nλ) is constant, due to the k-vector matching between the electromagnetic field and the lattice for this resonant structure. Constant temperature measurements have previously shown that the dispersion across the band gap ranges from a negative value of –1000 ps/nm-km on the short wavelength side of the band gap to a positive value of +5000 ps/nm-km near the long wavelength edge. Therefore, in accordance with the teachings of the present invention, the large change in dispersion with wavelength and the linear shift in the band gap position with temperature provide the ability to finely adjust the dispersion from large negative values to large positive values by adjusting the ambient temperature of the fiber.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the present invention as defined by the claims appended hereto.

What is claimed is:

1. A photonic band gap fiber structure comprising a core region of a material exhibiting a relatively low index of refraction;

a lattice-structured region surrounding said core region, the lattice-structured region comprising a plurality of air holes with at least a longitudinal extent of said plurality of air holes filled with a material exhibiting a temperature-dependent index of refraction wherein the room temperature value of the temperature-dependent index of refraction is greater than the relatively low index of refraction associated with said core region, wherein the dispersion value associated with said photonic band gap fiber structure is controlled by controlling the temperature of said photonic band gap fiber structure.

2. A photonic band gap fiber structure as defined in claim 1 wherein the core region comprises silica.

3. A photonic band gap fiber structure as defined in claim 1 wherein the plurality of air holes are filled with a liquid material exhibiting a temperature-dependent index of refraction less than the index of refraction of the core region.

4. A photonic band gap fiber structure as defined in claim 3 wherein the liquid exhibits a temperature-dependent index of refraction change of approximately $-6.8*10^{-4}/°$ C.

5. A photonic band gap fiber structure as defined in claim 1 wherein the core region comprises silica with an index of refraction of approximately 1.4 and the material filled in the plurality of air holes exhibits a room temperature index of refraction of approximately 1.8.

* * * * *